Patented Oct. 15, 1946

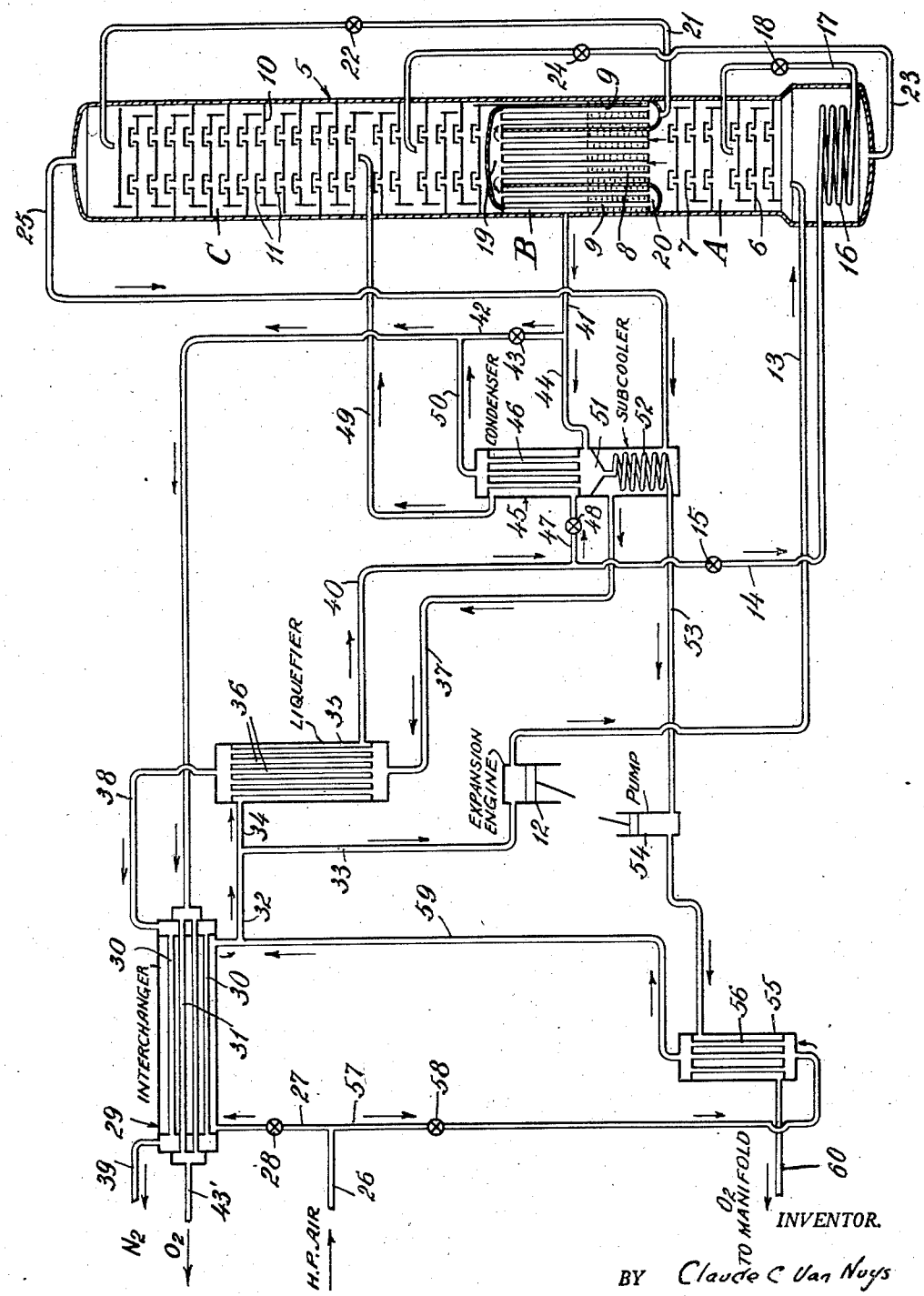

2,409,458

UNITED STATES PATENT OFFICE 2,409,458

SEPARATION OF THE CONSTITUENTS OF GASEOUS MIXTURES

Claude C. Van Nuys, Greenwich, Conn., assignor to Air Reduction Company, Incorporated, New York, N. Y., a corporation of New York Application April 27, 1943, Serial No. 484,720

9 Claims. (Cl. 62—175.5)

This invention relates to the liquefaction and separation of the constituents of gaseous mixtures and particularly to a method of recovering one of the constituents substantially free from impurities and in the liquid phase.

The invention will be described in connection with the liquefaction of air and the recovery of liquid oxygen. It may be used, however, in the treatment of other gaseous mixtures to recover desired constituents thereof.

The liquefaction and separation of the constituents, particularly oxygen and nitrogen, of atmospheric air, has been practised commercially for many years. The constituents are ordinarily withdrawn and stored as gases. For certain purposes, supplies of liquid oxygen are desirable. The liquid can be obtained by compressing and cooling the gaseous product of the separation, but this involves the application of additional energy and the construction and maintenance of elaborate equipment for compressing, drying and cooling.

It is the object of the present invention to afford a simple, efficient and readily operable method of producing from a mixture of gases a pure gas, such as pure oxygen, which minimizes the use and loss of energy and hence permits attainment of the object in a commercially economical manner.

Other objects and advantages of the invention will be apparent as it is better understood by reference to the following specification and the accompanying drawing, which illustrates diagrammatically an apparatus suitable for the practice of the invention. Numerous details of the apparatus which are familiar in the art have been omitted for the purpose of clarity. The invention, moreover, is not limited to the use of any particular apparatus or to the arrangement thereof as illustrated in the drawing.

I have discovered that it is possible to produce a liquefied constituent such as oxygen in the operation of a liquefaction system by utilizing cold available in the products of the system and without expending additional energy for the compression of the desired constituent in the gaseous phase. Furthermore, the procedure as described permits a further purification of the desired constituent by eliminating therefrom impurities, which may be present, during the liquefaction procedure.

The invention will be readily understood by reference to the drawing, in which 5 indicates a liquefaction and rectification column divided into three compartments, A, B, and C. The lowest compartment, A, is provided with the usual trays 6 having bubble caps 7 or other convenient means to effect maximum contact between vapors rising through the compartment and liquids descending therein. The compartment B comprises groups of tubes 8 and 9 through which vapors may rise and then descend in heat exchange relation with a liquid surrounding the tubes. The compartment C includes a plurality of trays 10 with the usual bubble caps 11 or other means to facilitate rectification.

Air, after initial compression to a relatively high pressure and subsequent cooling, is expanded in an expansion engine 12 of the usual type employed in the well known "Claude process." The air, at a pressure somewhat above one atmosphere, is delivered by a pipe 13 to the compartment A and rises through the trays 6 in contact with liquid formed as hereinafter described. Liquefied air is delivered by a pipe 14 controlled by a valve 15 to a coil 16 in the bottom of the compartment A in which it is surrounded by a liquid product of the separation consisting of approximately 38%–40% oxygen, the balance being nitrogen. The liquefied air is delivered from the coil 16 through a pipe 17 controlled by an expansion valve 18 to an intermediate level of the compartment A from which it flows downwardly over the trays 6 in contact with the air introduced through the pipe 13.

Vapors rising from the bottom of the compartment A and vapors formed therein, together with the air introduced through the pipe 13, enter the tubes 8 of the compartment B. In rising through the tubes, the air is subjected, by heat exchange with liquid and vapors surrounding the tubes, to "backward return" condensation, thus providing a liquid enriched in oxygen which descends through the trays 6 of the compartment A, and a vapor enriched in nitrogen which is delivered to the head 19. These vapors descend through the tubes 9 to a collector 20, and being condensed in the tubes, afford a liquid enriched in nitrogen which is withdrawn through the collector 20 by a pipe 21 controlled by an expansion valve 22 and delivered to the top of the column 5, where it serves as a reflux liquid descending over the trays 10 therein. Thus the low pressure air is separated into two liquid portions, one enriched in oxygen and the other in nitrogen. The liquid enriched in oxygen from the bottom of the compartment A is delivered through a pipe 23 controlled by an expansion valve 24 to an intermediate level of the compartment C and descends over the trays 10 therein in contact with vapors rising through the compartment.

As the result of the operation as described, the air in the liquid and vapor phases is first subjected by backward return condensation and rectification, to partial enrichment in oxygen, the balance of the vapor being condensed to afford the nitrogen reflux. As the liquids descend through the compartment C of the column, a continuous exchange occurs as the result of rectification to produce substantially pure oxygen liquid which passes into the compartment B and accumulates about the tubes 8 and 9 in the compartment B and an effluent consisting principally of nitrogen which escapes through the pipe 25 at the top of the column.

The air entering the system, after being compressed to high pressure and cooled in the usual manner, is introduced through a pipe 26. The major portion thereof is delivered through a pipe 27 controlled by a valve 28 to an exchanger 29 through which it passes in heat exchange relation with gaseous products of the separation passing through the tubes 30 and 31 of the exchanger. The air is thereby further cooled and is delivered through a pipe 32. A portion of the air which is still at high pressure is delivered through the pipe 33 to the expansion engine 12 as hereinbefore described. The balance of the high pressure air passes through a pipe 34 to the liquefier 35 and circulates about tubes 36 therein to which cold nitrogen from the top of the column 5 is delivered by a pipe 37 after the nitrogen has been utilized as hereinafter described. The nitrogen escapes through a pipe 38 to the tubes 30 of the exchanger 29 and is finally delivered through a pipe 39 to the atmosphere or to storage, as may be desired.

The liquid from the liquefier 35 is withdrawn through a pipe 40, and a portion thereof is delivered by the pipe 14 to the coil 16 as hereinbefore described.

To obtain pure liquid oxygen, as the desired product, I withdraw oxygen vapor from the compartment B of the column 5 at a level above the level of the liquid oxygen in the compartment through a pipe 41. A portion of the oxygen vapor can be diverted through a pipe 42 controlled by a valve 43 to the exchanger 29 wherein it passes through the tubes 31 and is finally withdrawn through a pipe 43′ and delivered to suitable storage facilities. The portion which is to be liquefied passes through a pipe 44 to a condenser 45 wherein it passes upwardly through a plurality of tubes 46 surrounded by liquid air from the liquefier 35 which is introduced through a pipe 47 controlled by a valve 48. The liquid air is vaporized in cooling the oxygen introduced through the pipe 44, and the vapor escapes through a pipe 49 and is delivered to an intermediate level of the compartment C in the rectifier wherein it is subjected to rectification with the descending liquid to effect the desired separation of the constituents.

In passing upwardly through the tubes 46, the oxygen is subjected to further "backward return" liquefaction, thus eliminating any impurities such as nitrogen which may remain in the vapor. The vapor passing from the top of the condenser 45 is delivered through a pipe 50 to the pipe 42 and thus joins the oxygen which is withdrawn as a gaseous product. The pure liquid oxygen descends through the tubes 46 into a collector 51 and thence passes through a coil 52 which is surrounded by cold nitrogen supplied by the pipe 25 from the top of the column 5. The cold nitrogen, by heat exchange with the liquid in the coil 52, reduces the temperature thereof. The nitrogen escapes through the pipe 37 to the tubes 36 of the liquefier 35. The sub-cooled liquid oxygen from the coil 52 is delivered by a pipe 53 to a liquid pump 54 which forces the liquid under high pressure, such for example as 2,000 pounds per square inch, into an exchanger 55 where it surrounds tubes 56. A portion of the high pressure air from the pipe 26 is delivered by a pipe 57 controlled by a valve 58 to the tubes 56, and being cooled by heat exchange with the liquid oxygen at high pressure, is delivered to the pipe 59 and thence to the pipe 32 from which it is diverted in the desired proportions to the liquefier 35 and the expansion engine 12. The cold oxygen vaporized in exchanger 55 is withdrawn through a pipe 60 and delivered to suitable storage facilities.

As will be evident from the foregoing description, all of the refrigeration required for the ultimate liquefaction of the oxygen product is supplied by the system without the necessity for external refrigeration or an additional input of energy for compression except in respect to the liquid pump 54. Furthermore, no waste of gaseous constitutents introduced to the system is possible because all of the gaseous mixture is ultimately separated and the constituents nitrogen and oxygen are effectively separated and recovered. A portion of the recovered oxygen is in the desired liquid phase and the balance is recovered in the vapor phase. The system is capable of efficient and economical operation because of the avoidance of losses with respect to products and losses of energy through failure to utilize the refrigerating effect provided in the system.

As hereinbefore indicated, other gaseous mixtures may be similarly treated to accomplish the recovery of one of the constituents in the liquid phase and the use of the invention for such purposes comes within the scope of the invention.

Various changes may be made in the form and arrangement of the apparatus and in the details of procedure without departing from the invention or sacrificing the advantages thereof.

I claim:

1. The method of separating air into its constituents, oxygen and nitrogen, which comprises compressing and cooling air at high pressure, liquefying a portion thereof at such high pressure, subjecting the remainder of the air to a reduction in pressure and liquefaction in two portions, one rich in oxygen and the other rich in nitrogen, subsequently rectifying said portions to produce separate fractions, one consisting essentially of oxygen and the other consisting essentially of nitrogen, withdrawing oxygen from said one fraction in the gaseous phase and subjecting it to backward return condensation by heat exchange with at least a part of the portion of the air liquefied at said high pressure, and separately withdrawing the liquid oxygen and the uncondensed residue thereof from the zone of backward return condensation.

2. The method of separating air into its constituents, oxygen and nitrogen, which comprises compressing and cooling air at high pressure, liquefying a portion thereof at such high pressure, subjecting the remainder of the air to a reduction in pressure and liquefaction in two portions, one rich in oxygen and the other rich in nitrogen, subsequently rectifying said portions to produce separate fractions, one consisting essentially of oxygen and the other consisting essentially of nitrogen, withdrawing oxygen from said one fraction in the gaseous phase and subjecting it to backward return condensation by heat exchange with at least a part of the portion of the air liquefied at said high pressure, separately withdrawing the liquid oxygen and the uncondensed residue thereof from the zone of backward return condensation and sub-cooling the liquid oxygen by heat exchange with said other fraction.

3. The method of separating air into its constituents, oxygen and nitrogen, which comprises compressing and cooling air at high pressure, liquefying a portion thereof at such high pressure, subjecting the remainder of the air to a reduction in pressure and liquefaction in two portions, one rich in oxygen and the other rich in nitrogen, subsequently rectifying said portions to produce separate fractions, one consisting essentially of oxygen and the other consisting essentially of nitrogen, withdrawing oxygen from said one fraction in the gaseous phase and subjecting it to backward return condensation by heat exchange with at least a part of the portion of the air liquefied at said high pressure, separately withdrawing the liquid oxygen and the uncondensed residue thereof from the zone of backward return condensation, sub-cooling the liquid oxygen by heat exchange with said other fraction, pumping the liquid oxygen to a relatively high pressure, and utilizing the cold of the liquid oxygen at high pressure to cool a portion of the incoming high pressure air.

4. The method of separating air into its constituents, oxygen and nitrogen, which comprises compressing and cooling air at high pressure, liquefying a portion thereof at such high pressure, subjecting the remainder of the air to a reduction in pressure and liquefaction in two portions, one rich in oxygen and the other rich in nitrogen, subsequently rectifying said portions to produce separate fractions, one consisting essentially of oxygen and the other consisting essentially of nitrogen, withdrawing oxygen from said one fraction in the gaseous phase and subjecting it to backward return condensation by heat exchange with at least a part of the portion of the air liquefied at said high pressure, separately withdrawing the liquid oxygen and the uncondensed residue thereof from the zone of backward return condensation, and delivering the air vaporized in cooling the oxygen to the zone of rectification for liquefaction of oxygen contained therein.

5. The method of separating air into its constituents, oxygen and nitrogen, which comprises compressing and cooling air at high pressure, liquefying a portion thereof at such high pressure, subjecting the remainder of the air to a reduction in pressure and liquefaction in two portions, one rich in oxygen and the other rich in nitrogen, subsequently rectifying said portions to produce separate fractions, one consisting essentially of oxygen and the other consisting essentially of nitrogen, withdrawing oxygen from said one fraction in the gaseous phase and subjecting it to backward return condensation by heat exchange with at least a part of the portion of the air liquefied at said high pressure, separately withdrawing the liquid oxygen and the uncondensed residue thereof from the zone of backward return condensation, sub-cooling the liquid oxygen by heat exchange with said other fraction, and delivering the air vaporized in cooling the oxygen to the zone of rectification for liquefaction of oxygen contained therein.

6. The method of separating air into its constituents, oxygen and nitrogen, which comprises compressing and cooling air at high pressure, liquefying a portion thereof at such high pressure, subjecting the remainder of the air to a reduction in pressure and liquefaction in two portions, one rich in oxygen and the other rich in nitrogen, subsequently rectifying said portions to produce separate fractions, one consisting essentially of oxygen and the other consisting essentially of nitrogen, withdrawing oxygen from said one fraction in the gaseous phase and subjecting it to backward return condensation by heat exchange with at least a part of the portion of the air liquefied at said high pressure, separately withdrawing the liquid oxygen and the uncondensed residue thereof from the zone of backward return condensation, delivering the air vaporized in cooling the oxygen to the zone of rectification for liquefaction of oxygen contained therein, sub-cooling the liquid oxygen by heat exchange with said other fraction, pumping the liquid oxygen from the zone of subcooling to a relatively high pressure, and utilizing the cold of the liquid oxygen at high pressure to cool a portion of the incoming high pressure air.

7. The method of separating air into its constituents, oxygen and nitrogen, which comprises compressing and cooling air at high pressure, liquifying a portion of the compressed and cooled air without substantial prior reduction of the pressure thereof, reducing the pressure of the remainder of the compressed and cooled air, subjecting the air at reduced pressure to liquefaction and subsequent rectification to separate it into two fractions, one consisting essentially of oxygen and the other consisting essentially of nitrogen, withdrawing oxygen in the gaseous form from said one fraction and subjecting it to backward return condensation by heat exchange substantially solely with air liquefied from the initially compressed and cooled air, separately withdrawing the liquid oxygen and the uncondensed residue thereof from the zone of backward return condensation, and delivering the air vaporized in cooling the gaseous oxygen to the zone of rectification for liquefaction of oxygen contained therein.

8. The method of separating air into its constituents, oxygen and nitrogen, which comprises compressing and cooling air at high pressure, liquefying a portion of the compressed and cooled air without substantial prior reduction of the pressure thereof, reducing the pressure of the remainder of the compressed and cooled air, subjecting the air at reduced pressure to liquefaction and subsequent rectification to separate it into two fractions, one consisting essentially of oxygen and the other consisting essentially of nitrogen, withdrawing oxygen in the gaseous form from said one fraction and subjecting it to backward return condensation by heat exchange substantially solely with air liquefied from the initially compressed and cooled air, separately withdrawing the liquid oxygen and the uncondensed residue thereof from the zone of backward return condensation, delivering the air vaporized in cooling the gaseous oxygen to the zone of rectification for liquefaction of oxygen contained therein, and sub-cooling the liquid oxygen from the zone of backward return condensation by heat exchange with said other fraction.

9. The method of separating air into its constituents, oxygen and nitrogen, which comprises compressing and cooling air at high pressure, liquefying a portion of the compressed and cooled air without substantial prior reduction of the pressure thereof, reducing the pressure of the remainder of the compressed and cooled air, subjecting the air at reduced pressure to liquefaction and subsequent rectification to separate it into two fractions, one consisting essentially of oxygen and the other consisting essentially of nitrogen, withdrawing oxygen in the gaseous form from said one fraction and subjecting it to backward return condensation by heat exchange substantially solely with air liquefied from the initially compressed and cooled air, separately withdrawing the liquid oxygen and the uncondensed residue thereof from the zone of backward return condensation, delivering the air vaporized in cooling the gaseous oxygen to the zone of rectification for liquefaction of oxygen contained therein, sub-cooling the liquid oxygen from the zone of backward return condensation by heat exchange with said other fraction, and pumping the liquid oxygen from the zone of subcooling to a relatively high pressure and utilizing the cold of the liquid oxygen at high pressure to cool a portion of the incoming high pressure air.

CLAUDE C. VAN NUYS.